(12) United States Patent
Gray et al.

(10) Patent No.: US 10,918,013 B2
(45) Date of Patent: Feb. 16, 2021

(54) AIR BOOM SPREADER FOR AGRICULTURAL PRODUCT

(71) Applicant: Salford Group Inc., Salford (CA)

(72) Inventors: Geof J. Gray, Burford (CA); John Mark Averink, Norwich (CA); Bradley William Baker, Stratford (CA); Jesse Abram Dyck, London (CA); Chad Derek Pasma, Beachville (CA); Adam Peter Lehman, Kenilworth (CA)

(73) Assignee: Salford Group Inc., Salford (CA)

( * ) Notice: Subject to any disclaimer, the term of this patent is extended or adjusted under 35 U.S.C. 154(b) by 0 days.

(21) Appl. No.: 16/963,102

(22) PCT Filed: Jan. 17, 2019

(86) PCT No.: PCT/CA2019/050064
§ 371 (c)(1),
(2) Date: Jul. 17, 2020

(87) PCT Pub. No.: WO2019/140526
PCT Pub. Date: Jul. 25, 2019

(65) Prior Publication Data
US 2020/0404838 A1    Dec. 31, 2020

Related U.S. Application Data

(60) Provisional application No. 62/620,125, filed on Jan. 22, 2018.

(51) Int. Cl.
*A01C 15/04* (2006.01)
*A01C 15/00* (2006.01)
(Continued)

(52) U.S. Cl.
CPC ............... *A01C 15/04* (2013.01); *A01C 7/20* (2013.01); *A01C 15/006* (2013.01); *A01C 15/18* (2013.01)

(58) Field of Classification Search
CPC ......... A01C 15/04; A01C 7/20; A01C 15/006; A01C 15/18; A01C 15/00; A01C 7/00; A01C 15/005
See application file for complete search history.

(56) References Cited

U.S. PATENT DOCUMENTS

| 4,852,809 A | 8/1989 | Davis et al. |
| 5,052,627 A | 10/1991 | Balmer |
| 5,950,933 A | 9/1999 | Balmer |

FOREIGN PATENT DOCUMENTS

EP    170911 A2    2/1986

OTHER PUBLICATIONS

International Search Report and Written Opinion dated Mar. 28, 2019 on PCT/CA2019/050064.
(Continued)

*Primary Examiner* — Christopher J. Novosad
(74) *Attorney, Agent, or Firm* — Brunet & Co. Ltd.; Robert Brunet; Hans Koenig

(57) ABSTRACT

A self-propelled air boom spreader has a container mounted on a frame, the container having a product hopper and a noise-reducing fan assembly compartment therein with a fan assembly including at least a fan and a motor for operating the fan mounted in the noise-reducing fan assembly compartment within the container. The spreader has a product distribution system for receiving product from the hopper and an air system, including the fan assembly, for receiving product from the distribution system and distributing the product to the environment. Situating the fan assembly in the container provides a quieter operating spreader and distributes the center of gravity of the spreader forward to reduce overloading of the rear axle, to avoid overbalancing the spreader at the rear axle and to reduce undesirable torque of the frame at the rear.

15 Claims, 9 Drawing Sheets

(51) Int. Cl.
*A01C 7/20* (2006.01)
*A01C 15/18* (2006.01)

(56) References Cited

OTHER PUBLICATIONS

Case 810 Flex-Air Applicator. Internet brochure dated Feb. 5, 2018.
Vaderstad Spirit 600-900C. Internet brochure dated Jan. 17, 2018.

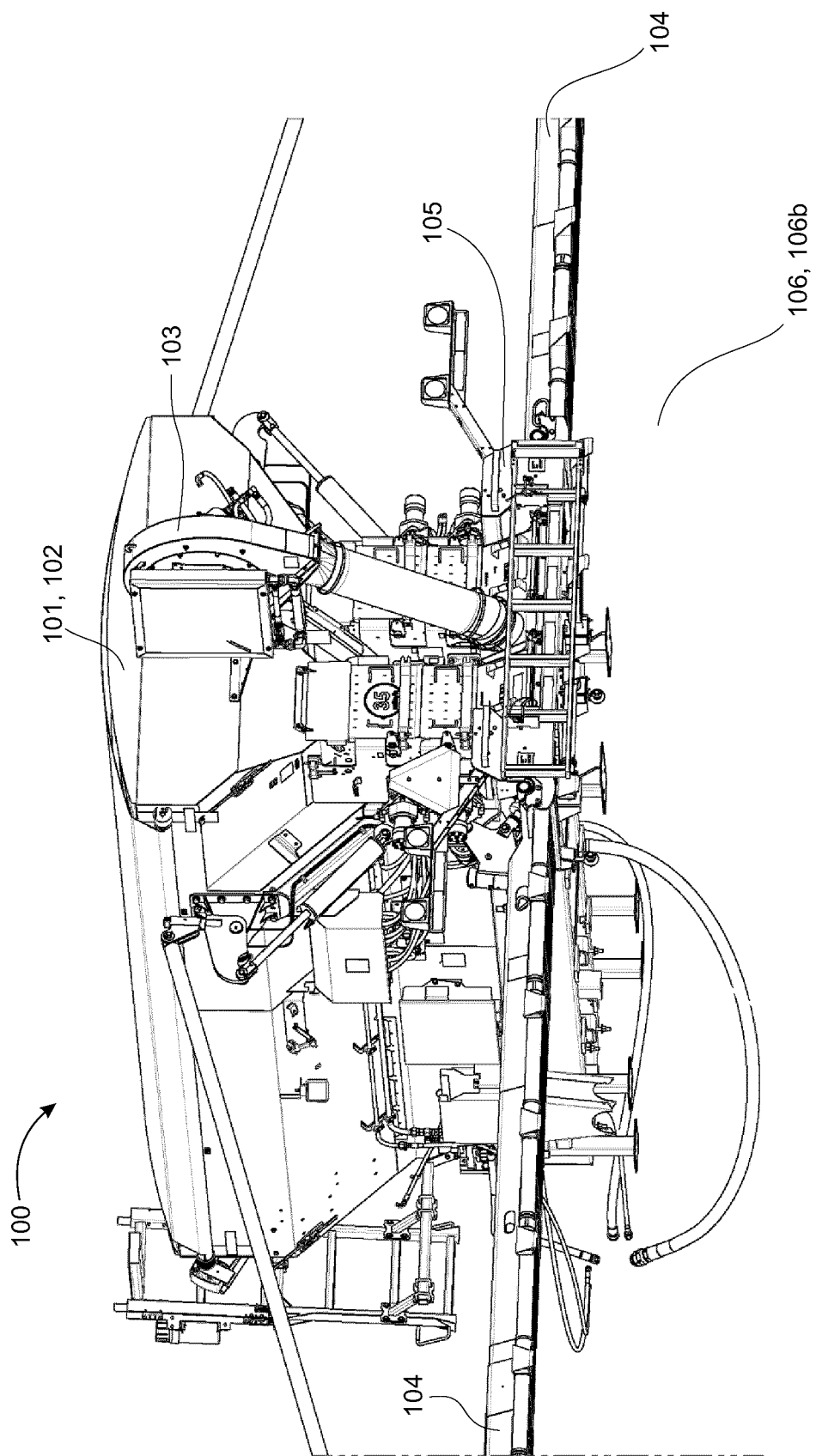
Fig. 1A - Prior Art

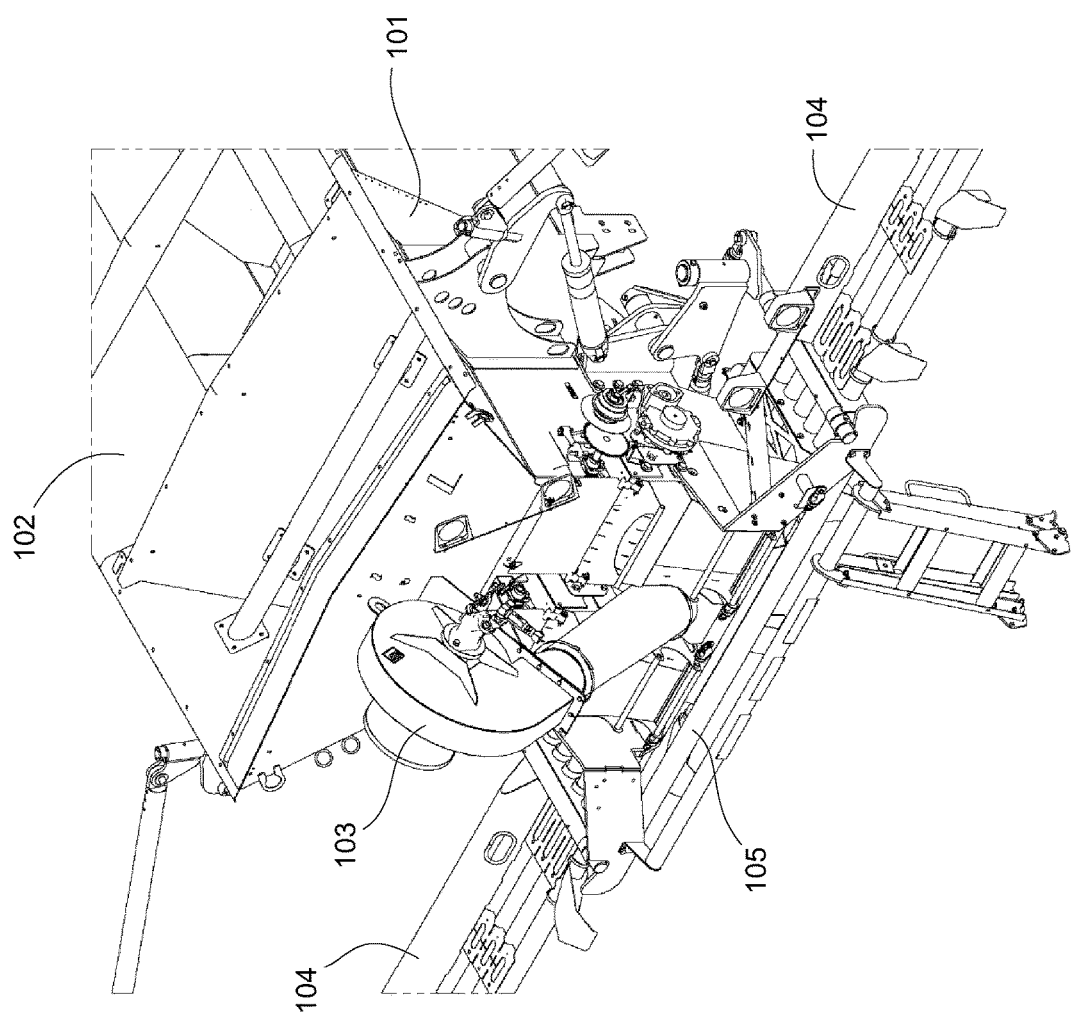
Fig. 1B - Prior Art

Figure 2A:
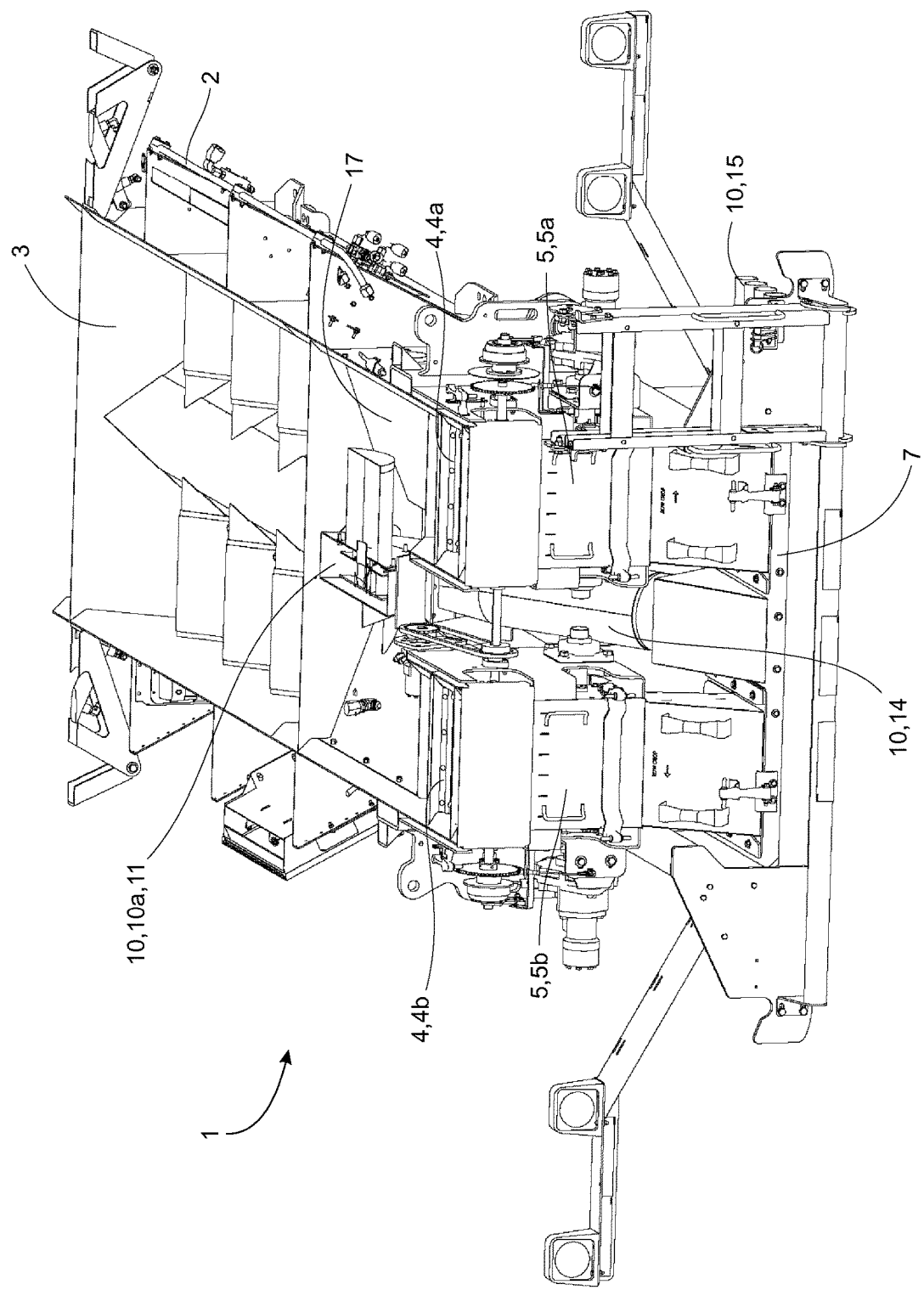
Figure 2B:
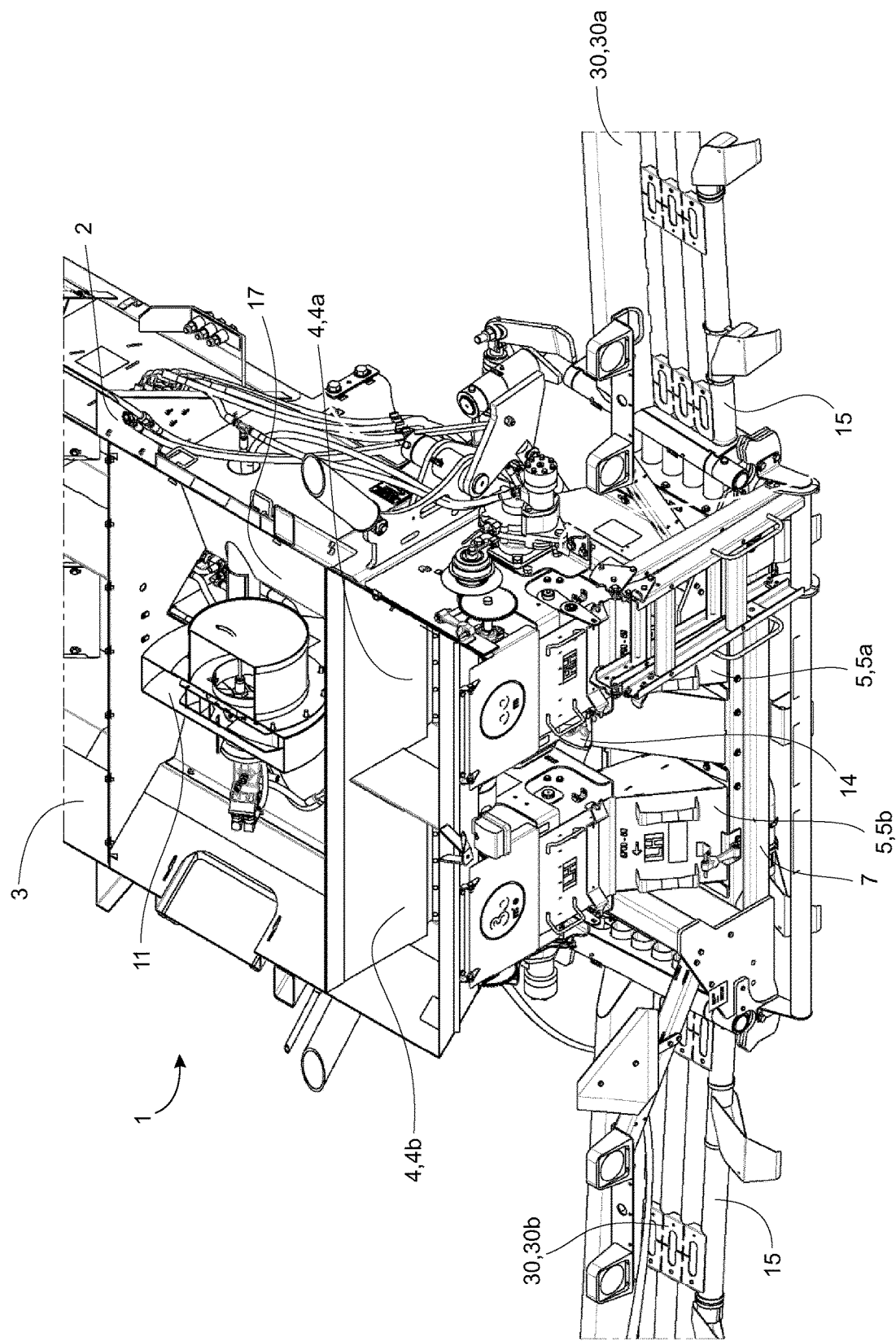
Figure 3:
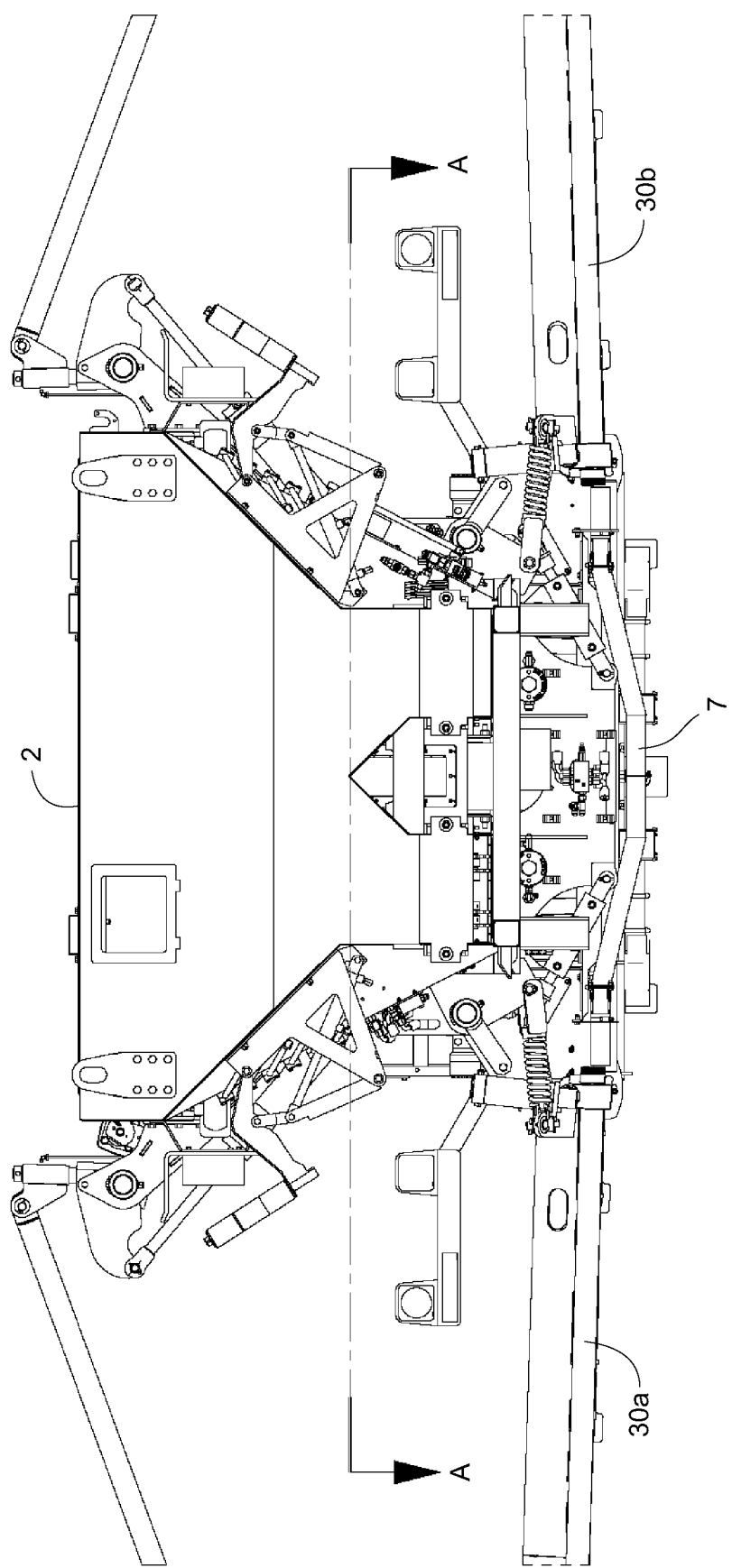
Figure 4:
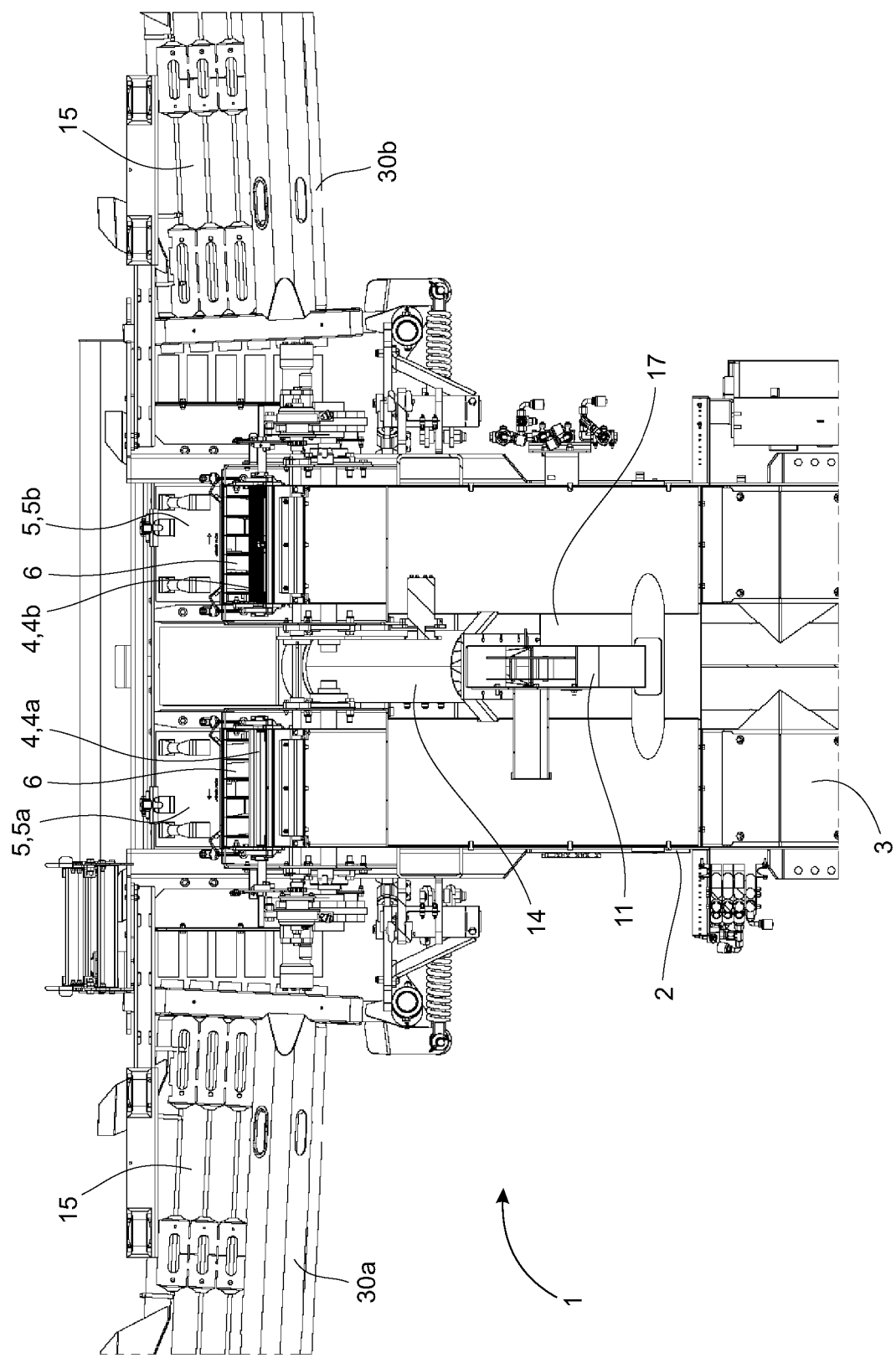
Figure 6B:
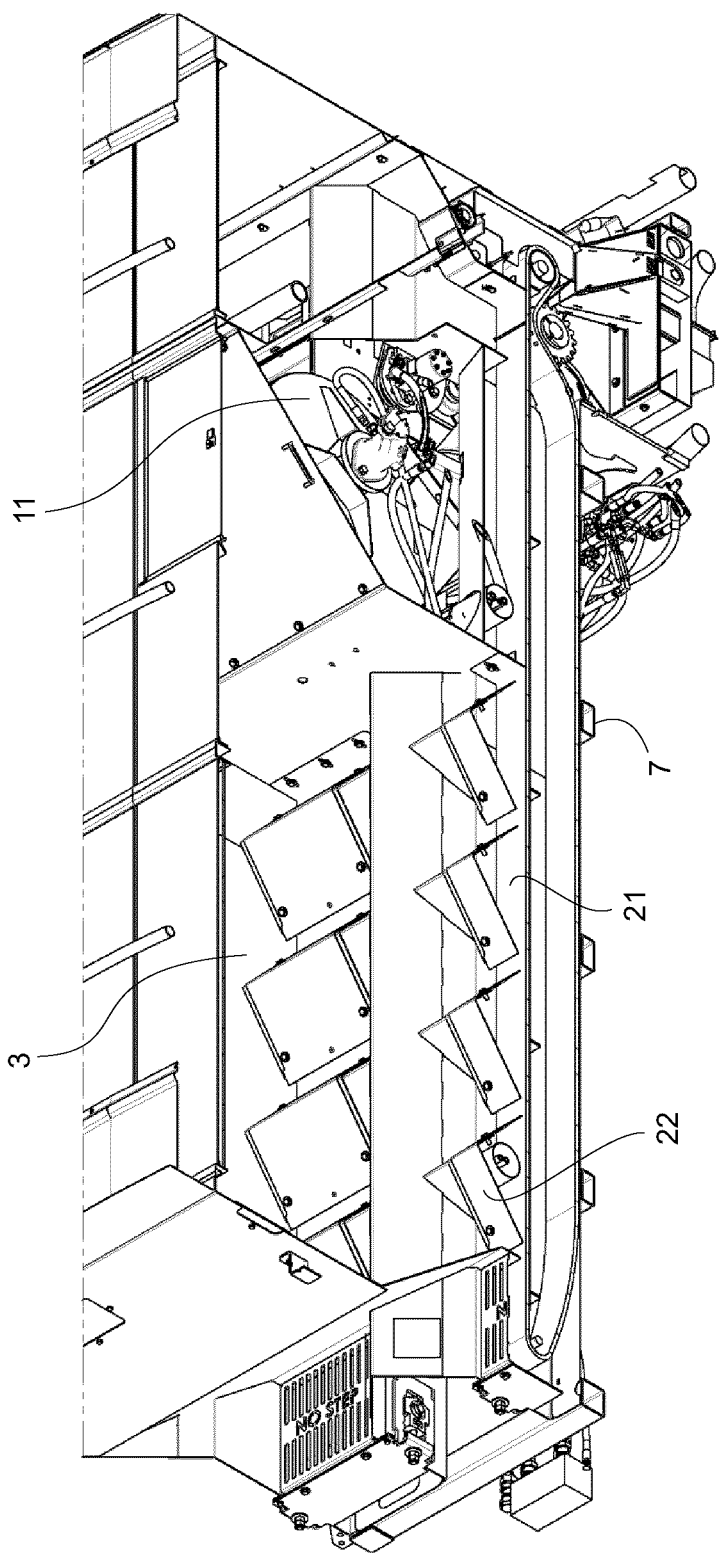

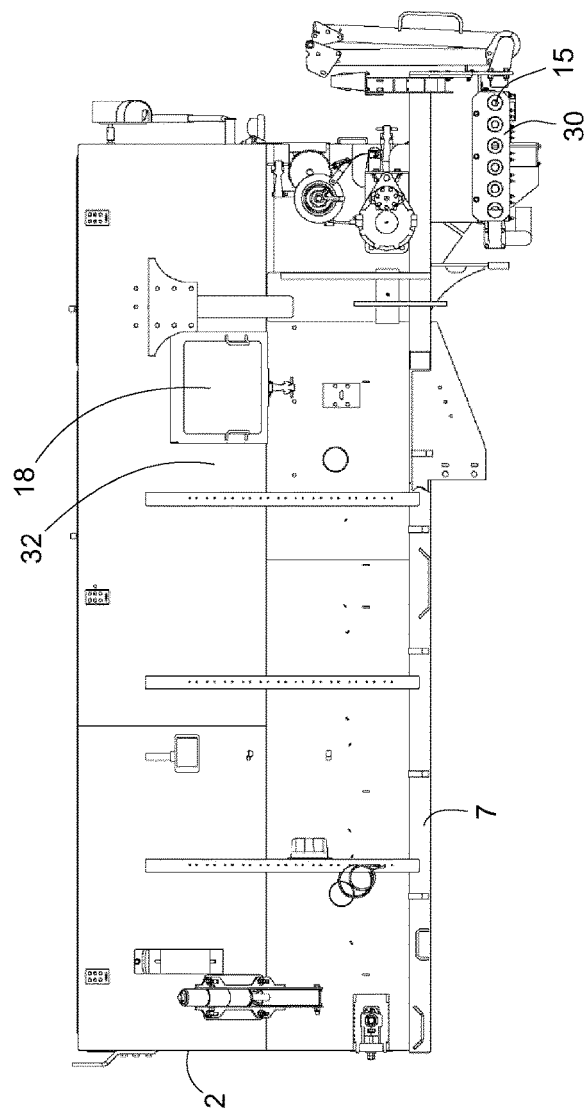
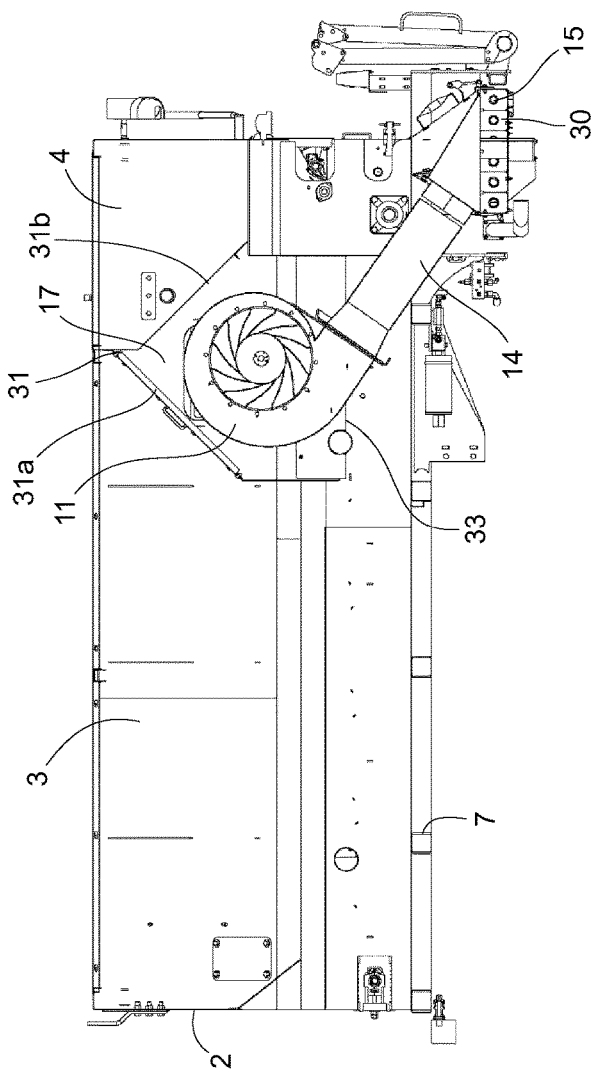
Fig. 5
Fig. 6A

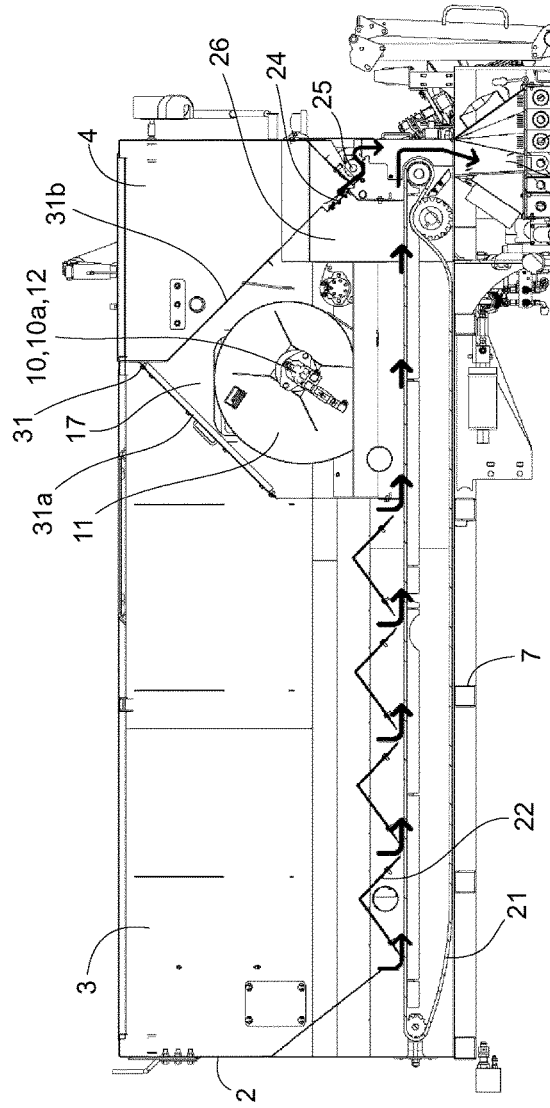
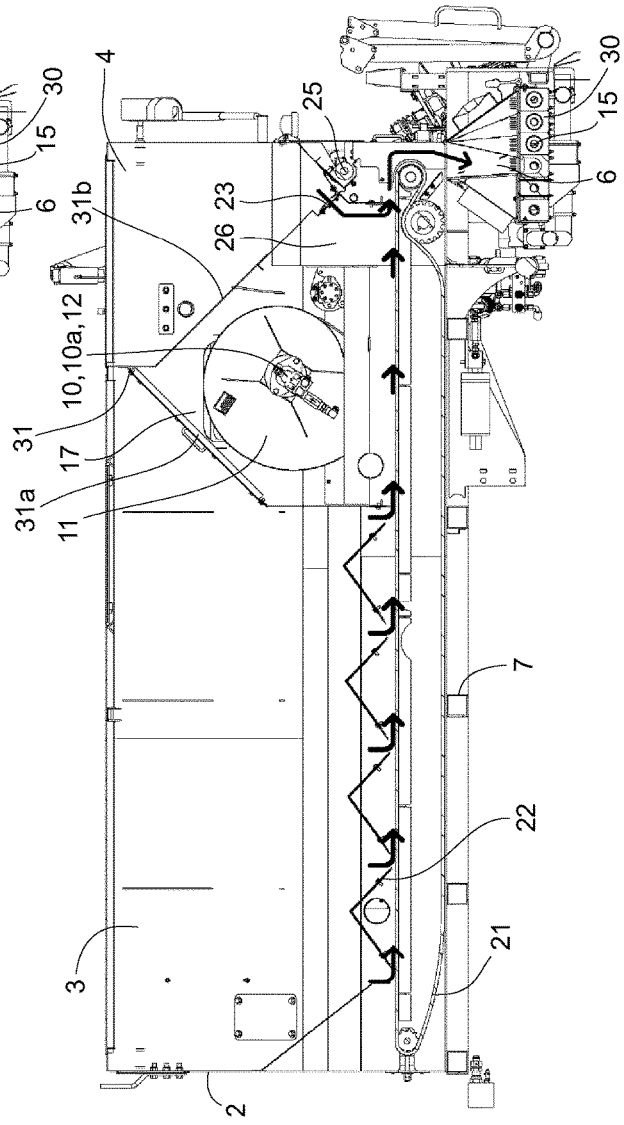
Fig. 7A
Fig. 7B

AIR BOOM SPREADER FOR AGRICULTURAL PRODUCT

CROSS-REFERENCE TO RELATED APPLICATIONS

This application is a national entry of PCT/CA2019/050064 filed Jan. 17, 2019 and claims the benefit of U.S. Provisional Patent Application Ser. No. 62/620,125 filed Jan. 22, 2018, the entire contents of both of which are herein incorporated by reference.

FIELD

This application relates to agriculture, in particular to an air boom spreader for delivering agricultural product to a field.

BACKGROUND

Current commercial self-propelled air boom spreaders comprise an air system entirely mounted on a rear of a frame of the spreader as shown in FIG. 1. With the advent of self-propelled air boom spreaders having shorter frames and taller tires, mounting the air system entirely on the rear of the frame can result in overbalancing the spreader at the rear axle and/or in undesirable torque of the frame at the rear. Attempts to overcome this problem by strapping the rear to the front are unsatisfactory. Further, air systems are very loud when operating, which is both annoying and potentially harmful to people and animals in proximity to the operating spreader.

There remains a need for a self-propelled air boom spreader which is quieter when operating and has a shorter frame in which the weight of the air system does not overbalance the spreader at the rear axle and/or cause undesirable torque of the frame at the rear.

SUMMARY

In one aspect, there is provided a self-propelled air boom spreader comprising: a frame; a boom arm extendible transversely to a direction of travel of the spreader; a container mounted on the frame, the container having a hopper for containing a product to be delivered to an environment around the spreader; a product distribution system in product communication with the hopper for receiving the product from the hopper; an air system in product communication with the distribution system for receiving the product from the distribution system, the air system comprising an air line mounted on the boom arm, the air line connecting the product distribution system to a product outlet situated on the boom arm to permit passage of the product from the product distribution system to the environment through the product outlet, and a fan assembly comprising at least a fan and a motor for operating the fan, the fan in fluid communication with the air line to create air flow in the air line to transport the product from the product distribution system to the product outlet, wherein the container comprises a noise-reducing fan assembly compartment within the container and the fan assembly is mounted in the noise-reducing fan assembly compartment within the container.

In another aspect, there is provided a self-propelled air boom spreader comprising: a frame; a boom arm extendible transversely to a direction of travel of the spreader; a container mounted on the frame, the container having a first hopper situated at a front of the container and a second hopper situated at a rear of the container, the first and second hoppers for containing one or more products to be delivered to an environment around the spreader; a product distribution system in product communication with the hoppers for receiving the product from the hoppers; an endless conveyor situated between the first hopper and the product distribution system, the endless conveyor conveying product from the first hopper to the product distribution system; a metering assembly situated between the second hopper and the product distribution system, the metering assembly capable of conveying product from the second hopper to the product distribution system; an intermediate metering chamber between the second hopper and the endless conveyor, the intermediate metering chamber capable of conveying product from the second hopper to the endless conveyor; an air system in product communication with the distribution system for receiving the product from the distribution system, the air system comprising an air line mounted on the boom arm, the air line connecting the product distribution system to a product outlet situated on the boom arm to permit passage of the product from the product distribution system to the environment through the product outlet, and a fan assembly comprising at least a fan and a hydraulic motor for operating the fan, the fan in fluid communication with the air line to create air flow in the air line to transport the product from the product distribution system to the product outlet; and, a noise-reducing fan assembly compartment situated within the container between the first hopper and the second hopper, the fan assembly mounted in the noise-reducing fan assembly compartment within the container, at least a portion of the endless conveyor capable of conveying product longitudinally in the container under the noise-reducing fan assembly compartment, and the meter roller assembly capable of conveying product vertically in the container rearward of the noise-reducing fan assembly compartment.

Situating heavy air system components, such as the fan assembly, in the product container rather than outside and at the rear of the product container provides a number of advantages over prior art air boom spreaders. First, the center of gravity of the spreader is moved forward thereby reducing load on a rear axle of the spreader, avoiding overbalancing the spreader at the rear axle and reducing undesirable torque of the frame at the rear of the spreader. To provide the product container with the same product capacity as the product containers of prior art air boom spreaders, the product container on the present spreader may have a greater height to compensate for the space lost when including the air system components in the product container. This further moves the center of gravity forward because the same mass of product is now localized farther forward in the product container.

Further, the fan assembly is typically very loud when operating. Situating the fan assembly in the product container advantageously dampens noise output of the fan assembly. Reduction of noise output is particularly desirable, and is becoming an important consideration in the field of air boom spreaders.

Furthermore, situating the fan assembly in the product container is safer, protecting people and property outside the product container should the fan assembly accidentally explode. In addition, air surrounding the fan assembly at the rear of prior art air boom spreaders is typically very dusty due to the passage of the spreader over soil, which leads to a greater potential for malfunction and more frequent maintenance of the fan assembly. The air surrounding the fan assembly situated in the product container is cleaner, thereby reducing maintenance costs and extending the life of the fan assembly. Also, situating the fan assembly in the product container is esthetically more pleasing as the fan assembly is no longer visible from the outside of the spreader. Also, with the fan assembly removed from the rear of the spreader, the product container may be filled from the rear of the container as well as from the sides. Also, situating the fan assembly in the product container prevents the fan assembly from inadvertently being crushed when the spreader is backed-up into a storage shed.

Other components of the air boom spreader may also be moved forward to move the center of gravity more forward. Other components of the air boom spreader may include, for example, drive motor assemblies for metering elements (e.g. conveyors, meter rollers) and the like. Moving the other components more forward better distributes weight forward of the rear axle when wider boom arms are used on the spreader. Wider boom arms are desirable to satisfy modern performance requirements, but add additional weight behind the rear axle of the spreader.

Moving the center of gravity forward is a more significant benefit for self-propelled spreaders than for towed spreaders, especially for self-propelled spreaders having the boom arms mounted at the rear of the container. In fact, moving the center of gravity forward in a towed spreader leads to increased tongue weight, which is a significant disadvantage for the towed spreader.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1A depicts a rear perspective view of a self-propelled air boom spreader of the prior art;

FIG. 1B depicts a rear perspective view of a rear portion of an air boom spreader of the prior art;

FIG. 2A depicts a rear perspective view of a portion of a self-propelled air boom spreader of the present invention;

FIG. 2B depicts a differently oriented rear perspective view of the rear portion of the air boom spreader of FIG. 2A;

FIG. 3 depicts a front-end view of FIG. 2A;

FIG. 4 depicts a section through A-A of FIG. 3 providing a view from a top of the spreader;

FIG. 5 depicts a side view of FIG. 2A;

FIG. 6A depicts a mid-plane longitudinal section of FIG. 5;

FIG. 6B depicts a cut-away side perspective view of FIG. 2B;

FIG. 7A depicts product flow in the product container of FIG. 2A for two different products from separate hoppers within the product container; and, FIG. 7B depicts product flow in the spreader of FIG. 2A for one product from separate hoppers within a product container.

DETAILED DESCRIPTION

Referring to FIG. 1A and FIG. 1B, a typical self-propelled air boom spreader 100 comprises a product container 101 having one or more hoppers 102 for holding particulate product, for example particulate agricultural products such as fertilizer, seed and the like. The container 101 is mounted on a frame 105, and a pair of transversely extendible boom arms 104 are also mounted on the frame 105. A fan assembly 103 is mounted at a rear and outside the container 101. The frame 105 is supported on wheels (not shown), the wheels comprising front wheels and rear wheels, the rear wheels connected by a rear axle. The fan assembly 103 is mounted rearwardly of the rear axle.

Referring to FIG. 2A to FIG. 7B, a self-propelled air boom spreader 1 of the present invention comprises a product container 2 mounted on a frame 7 of the spreader 1. The frame 7 is supported on wheels (not shown), including rear wheels (not shown) connected by a rear axle (not shown). The product container 2 comprises therein a main bin 3 and a micro-metering bin 4. The main bin 3 is situated at a front of the container 2 while the micro-metering bin 4 is situated at a rear of the container 2. The micro-metering bin 4 is transversely separated into two portions, a right-side portion 4*a* and a left-side portion 4*b*. The two bins 3, 4 contain a particulate product, for example particulate agricultural products such as fertilizer, seed and the like. The two bins 3, 4 may contain the same particulate product, or different particulate products. The two bins 3, 4 deliver their respective particulate products to a funnel manifold 5 comprising a plurality of funnels 6 (only one labeled in FIG. 7A and FIG. 7B and only two labeled in FIG. 3). The manifold 5 is a product distribution system, wherein product from the funnels 6 is delivered to an air system 10 for distribution of the product to the environment. While two hoppers are illustrated, the container may comprise more than two hoppers, for example 3, 4, 5 or more hoppers, all of which deliver particulate material to the product distribution system. Further, while having the main bin situated at the front of the container and the micro-metering bin situated at the rear is an advantageous configuration, it is possible to spatially configure the bins differently if desired.

The air system 10 comprises a fan assembly 10*a* and a plurality of venturi air lines 15. The fan assembly 10*a* comprising a fan 11, a hydraulic motor 12 to operate the fan 11 and a main duct 14 to direct an air stream from the fan 11 to the plurality of air lines 15. A hydraulic pump (not shown) mounted on a chassis of the spreader 1 powers the hydraulic motor 12, the hydraulic pump being connected to a hydraulic fluid reservoir (not shown) by hydraulic line (not shown). The hydraulic pump is powered by a main motor (not shown), which also drives a drive train, and therefore the wheels of the spreader 1.

The fan assembly 10*a* is situated in a noise-reducing fan assembly compartment 17 within the container 2 between the main bin 3 and the micro-metering bin 4. Other spatial configurations are possible, but having the noise-reducing fan assembly compartment 17 between the main bin 3 and the micro-metering bin 4 is especially advantageous. The main duct 14 is oriented obliquely from the fan 11 proximate a top of the noise-reducing fan assembly compartment 17 down to the air lines 15 to direct the air stream rearwardly from the fan 11 to the air lines 15. The main duct 14 passes between the right-side portion 4*a* and the left-side portion 4*b* of the micro-metering bin 4, and passes beneath at least a portion of the micro-metering bin 4. The main duct 14 may pass between and beneath the two portions 4*a*, 4*b* of the micro-metering bin 4.

The noise-reducing fan assembly compartment 17 comprises a peaked ceiling 31, side walls 32 (only one labeled), end walls and a bottom 33, the bottom 33 having an opening therein to permit passage of the main duct 14. The side walls 32 are common structures with the walls of the container 2. The peaked ceiling 31 comprises a first angled ceiling portion 31a that meets with a second angled ceiling portion 31b to form a peak. The first angled ceiling portion 31a forms a partition between the noise-reducing fan assembly compartment 17 and the main bin 3, while the second angled ceiling portion 31b forms a partition between the noise-reducing fan assembly compartment 17 and the micro-metering bin 4. The angled ceiling portions 31a, 31b direct noise from the fan downward, and the products in the main bin 3 and micro-metering bin 4 help muffle the noise generated by the fan assembly 10a in the noise-reducing fan assembly compartment 17.

The noise-reducing fan assembly compartment 17 further comprises at least one air intake port 18, preferably in the side wall 32 of the noise-reducing fan assembly compartment 17 to permit the fan 11 to draw air into the noise-reducing fan assembly compartment 17 from an exterior environment around the container 2. The air intake port 18 is preferably covered by a mesh screen to screen out foreign matter. In the illustrated embodiment, there are two air intake ports, one on each side of the noise-reducing fan assembly compartment 17.

Thus, the fan assembly 10a is situated in a sound-muffling environment within the spreader 1 to reduce noise output to the external environment. The fan assembly 10a is also situated mainly forward of a rear axle of the spreader 1, thereby distributing more weight forward ensuring that a center of gravity of the spreader 1 is forward of the rear axle of the spreader 1.

The product in the main bin 3 is delivered to the manifold 5 by an endless conveyor 21 situated at or proximate a bottom of the main bin 3, as best seen in FIG. 7A and FIG. 7B, where arrows show product flow in the container 2. The endless conveyor 21 conveys the product longitudinally from front to rear in the container 2. The product on the endless conveyor 21 is separated by a divider for delivery to a right-side portion 5a of the manifold 5 and a left-side portion 5b of the manifold 5. The manifold 5 may further comprise an apron to further divide the product between the funnels 6. At least a portion of the endless conveyor 21 passes under the noise-reducing fan assembly compartment 17. While a portion of the endless conveyor is illustrated passing under the noise-reducing fan assembly compartment, a portion of the endless conveyor could pass through the noise-reducing fan assembly compartment.

The product in the micro-metering bin 4 may be delivered to the manifold 5 by a meter roller assembly 25 as seen in FIG. 7A, or the meter roller assembly 25 may be by-passed as seen in FIG. 7B by allowing the product to drop down under the influence of gravity from the micro-metering bin 4 through a closable aperture 23 into an intermediate metering chamber 26 and then from the intermediate metering chamber 26 directly on to the endless conveyor 21 through a vertically adjustable secondary gate (not shown) proximate a bottom of the intermediate metering chamber 26. The secondary gate controls flow of the product from the intermediate metering chamber 26 to the endless conveyor 21. The aperture 23 is closable with a rotating panel 24 mounted on a partition separating the intermediate metering chamber 26 from the micro-metering bin 4.

FIG. 7B illustrates product flow when the main bin 3 and the micro-metering bin 4 contain the same product. The configuration illustrated in FIG. 7B delivers product to the manifold 5 at one rate because all of the product is delivered to the manifold 5 by the endless conveyor 21. The speed of the endless conveyor 21 primarily dictates the rate at which the product is metered to the manifold 5. Metering hats 22 (only one labeled) help meter product from the main bin 3 on to the endless conveyor 21, and the amount of product dropping on to the endless conveyor 21 from the micro-metering bin 4 through the aperture 23 is limited by the secondary gate, the angle of repose of the product on the endless conveyor 21, the height of the hats 22 and the height of primary gates (not shown) in the section of the endless conveyor 21 on which the product from the micro-metering bin 4 is falling.

The intermediate metering chamber 26 is situated forward of the manifold 5, and between the micro-metering bin 4 and the endless conveyor 21. In the illustrated embodiment, the intermediate metering chamber 26 is also situated between the noise-reducing fan assembly compartment 17 and the micro-metering bin 4; however, other spatial configurations of the intermediate metering chamber 26 in relation to the noise-reducing fan assembly compartment 17 and the micro-metering bin 4 are possible.

FIG. 7A illustrates product flow when the main bin 3 and the micro-metering bin 4 contain different products. When the micro-metering bin 4 delivers the product to the manifold 5 rather than to the endless conveyor 21, the right-side portion 4a of the micro-metering bin 4 may comprise a right-side meter roller assembly to deliver the product to a right-side portion 5a of the manifold 5, and the left-side portion 4b of the micro-metering bin 4 may comprise a left-side meter roller assembly to deliver the product to a left-side portion 5b of the manifold 5. In this configuration, the meter roller assembly conveys the product vertically in the container 2 rearward of the noise-reducing fan assembly compartment 17. While meter rollers are illustrated, any other suitable metering elements may be employed instead of or in addition to meter rollers, for example conveyors, augers and the like.

The configuration illustrated in FIG. 7A may be used to distribute two different products at different rates per hectare. The funnel manifold 5 directly receives product metered from two different sources, the main bin 3 and the micro-metering bin 4. The endless conveyor 21 delivers a first product from the main bin 3 directly to the manifold 5, while the meter roller assembly 25 delivers a second product from the micro-metering bin 4 directly to the manifold 5. This provides the opportunity to meter the first product at a different rate than the second product in order to distribute a desired ratio of the first product to the second product to the environment.

The air lines 15 are in fluid communication with the main duct 14, and in product communication with the funnel manifold 5. The air lines 15 are mounted on a boom arm 30, and terminate at product outlets (not shown) for distribution of the product to the environment. The air lines 15 may comprise venturis to facilitate air flow in the lines to carry the product through the lines from the funnel manifold 5 to the product outlets. The boom arm 30 comprises two boom arms, a first boom arm 30*a* extendible transversely to a first side of the frame 7 and a second boom arm 30*b* extendible transversely to an opposed second side of the frame 7. The boom arms 30*a*, 30*b* may be folded inwardly and forwardly to point longitudinally along sides of the container 2 for storage and transportation.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A self-propelled air boom spreader comprising:
a frame;
a boom arm extendible transversely to a direction of travel of the self-propelled air boom spreader;
a container mounted on the frame, the container having a first hopper situated at a front of the container and a second hopper situated at a rear of the container, the first and second hoppers for containing one or more products to be delivered to an environment around the self-propelled air boom spreader;
a product distribution system in product communication with the first and second hoppers for receiving the product from the first and second hoppers;
an endless conveyor situated between the first hopper and the product distribution system, the endless conveyor conveying product from the first hopper to the product distribution system;
a metering assembly situated between the second hopper and the product distribution system, the metering assembly capable of conveying product from the second hopper to the product distribution system;
an intermediate metering chamber between the second hopper and the endless conveyor, the intermediate metering chamber capable of conveying product from the second hopper to the endless conveyor;
an air system in product communication with the product distribution system for receiving the product from the product distribution system, the air system comprising
an air line mounted on the boom arm, the air line connecting the product distribution system to a product outlet situated on the boom arm to permit passage of the product from the product distribution system to the environment through the product outlet, and
a fan assembly comprising a fan and a hydraulic motor for operating the fan, the fan in fluid communication with the air line to create air flow in the air line to transport the product from the product distribution system to the product outlet; and,
a noise-reducing fan assembly compartment situated within the container between the first hopper and the second hopper, the fan assembly mounted in the noise-reducing fan assembly compartment within the container, at least a portion of the endless conveyor capable of conveying product longitudinally in the container under the noise-reducing fan assembly compartment, and metering assembly capable of conveying product vertically in the container rearward of the noise-reducing fan assembly compartment.

2. The spreader of claim 1, wherein the intermediate metering chamber is situated between the second hopper and the noise-reducing fan assembly compartment.

3. The spreader of claim 1, wherein the fan assembly further comprises a main duct fluidly connecting the fan to the air line, the main duct situated between and beneath two portions of the second hopper.

4. The spreader of claim 1, wherein the noise-reducing fan assembly compartment comprises a peaked ceiling.

5. A self-propelled air boom spreader comprising:
a frame;
a boom arm extendible transversely to a direction of travel of the self-propelled air boom spreader;
a container mounted on the frame, the container having a hopper for containing a product to be delivered to an environment around the self-propelled air boom spreader;
a product distribution system in product communication with the hopper for receiving the product from the hopper;
an air system in product communication with the product distribution system for receiving the product from the product distribution system, the air system comprising
an air line mounted on the boom arm, the air line connecting the product distribution system to a product outlet situated on the boom arm to permit passage of the product from the product distribution system to the environment through the product outlet, and
a fan assembly comprising a fan and a motor for operating the fan, the fan in fluid communication with the air line to create air flow in the air line to transport the product from the product distribution system to the product outlet,
wherein the container comprises a noise-reducing fan assembly compartment within the container and the fan assembly is mounted in the noise-reducing fan assembly compartment within the container.

6. The spreader of claim 5, wherein the fan assembly further comprises a main duct fluidly connecting the fan to the air line, the main duct situated between and beneath two portions of the hopper.

7. The spreader of claim 5, wherein the noise-reducing fan assembly compartment comprises an air intake port fluidly connecting the noise-reducing fan assembly compartment with an exterior environment around the container.

8. The spreader of claim 5, wherein the hopper comprises a first hopper situated at a front of the container and a second hopper situated at a rear of the container, wherein the noise-reducing fan assembly compartment is situated between the first hopper and the second hopper.

9. The spreader of claim 8, further comprising:
an endless conveyor situated between the first hopper and the product distribution system, the endless conveyor conveying product from the first hopper to the product distribution system; and,
a metering assembly situated between the second hopper and the product distribution system, the metering assembly capable of conveying product from the second hopper to the product distribution system.

10. The spreader of claim 9, further comprising an intermediate metering chamber between the second hopper and the endless conveyor, the intermediate metering chamber capable of conveying product from the second hopper to the endless conveyor.

11. The spreader of claim 10, wherein the intermediate metering chamber is situated between the second hopper and the noise-reducing fan assembly compartment.

12. The spreader of claim 9, wherein at least a portion of the endless conveyor conveys product longitudinally in the container under or through the noise-reducing fan assembly compartment.

13. The spreader of claim 9, wherein the metering assembly comprises meter rollers that are capable of conveying product vertically in the container rearward of the noise-reducing fan assembly compartment.

14. The spreader of claim 5, wherein the product distribution system comprises a plurality of funnels, the air line comprises a plurality of airlines and the product outlet comprises a plurality of product outlets, the plurality of funnels distributes the product to the plurality of air lines for distribution to the plurality of product outlets.

15. The spreader of claim 5, wherein the boom arm comprises two boom arms, a first boom arm extendible transversely to a first side of the frame and a second boom arm extendible transversely to an opposed second side of the frame.

\* \* \* \* \*